US012123982B2

(12) United States Patent
Tubert

(10) Patent No.: US 12,123,982 B2
(45) Date of Patent: Oct. 22, 2024

(54) SYCHRONIZATION DEVICE, ASSOCIATED TIME OF FLIGHT SENSOR AND METHOD

(71) Applicant: STMicroelectronics (Grenoble 2) SAS, Grenoble (FR)

(72) Inventor: Cedric Tubert, Saint-Egreve (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 873 days.

(21) Appl. No.: 17/177,608

(22) Filed: Feb. 17, 2021

(65) Prior Publication Data
US 2021/0255291 A1 Aug. 19, 2021

(30) Foreign Application Priority Data

Feb. 17, 2020 (FR) ...................... 2001538

(51) Int. Cl.
G01S 7/48 (2006.01)
G01S 7/4865 (2020.01)
G01S 7/497 (2006.01)
G01S 17/36 (2006.01)

(52) U.S. Cl.
CPC ............ G01S 7/497 (2013.01); G01S 7/4865 (2013.01); G01S 17/36 (2013.01)

(58) Field of Classification Search
None
See application file for complete search history.

(56) References Cited

U.S. PATENT DOCUMENTS 11,079,478 B2  8/2021  Perenzoni et al.
11,303,859 B2  4/2022  Dutton et al.
2018/0259628 A1  9/2018  Plank et al.
2018/0321360 A1  11/2018  Hall et al.
2019/0293792 A1  9/2019  Keel et al.

FOREIGN PATENT DOCUMENTS

CN  206650793 U  11/2017
CN  107885023 A  4/2018
CN  109239694 A  1/2019
(Continued)

OTHER PUBLICATIONS

Nikolic, Borivoje, "High-Speed Electrical Interfaces", EE290C—Spring 2004 Advanced Topics in Circuit Design, Lecture 8, Components Phase-Locked Loops, Feb. 23, 2004, 24 pages.
(Continued)

Primary Examiner — Hovhannes Baghdasaryan
(74) Attorney, Agent, or Firm — Slater Matsil, LLP

(57) ABSTRACT

An embodiment device for synchronizing the emission and the reception of a light signal for a time-of-flight sensor comprises a power-control circuit configured to generate and transmit a power signal based on a control signal for controlling the sensor, the power signal being configured to supply power to an array of pixels of the sensor, a production module for producing a synchronization signal, which module is configured to produce the synchronization signal based on the control signal, and a switch configured to supply power to a light source of a device for emitting the light signal, the production module being further configured to transmit the synchronization signal to the switch such that the time taken to produce and transmit the synchronization signal and the time taken to generate and transmit the power signal are identical.

20 Claims, 2 Drawing Sheets

(56) References Cited

FOREIGN PATENT DOCUMENTS

KR          20190110884 A     10/2019

OTHER PUBLICATIONS

Palermo, Sam, "ECEN620: Network Theory Broadband Circuit Design Lecture 15: Delay-Locked Loops (DLLs)", Analog & Mixed-Signal Center, Texas A&M University, Fall 2014, 29 pages.
West, Neil H. E., et al., "CMOS VLSI Design A Circuits and Systems Perspective", Lecture 22: PLLs and DLLs, 4th Edition, Boston: Addison Wesley, ISBN : 9780321547743, Mar. 1, 2010, 21 pages.

[Fig 1]
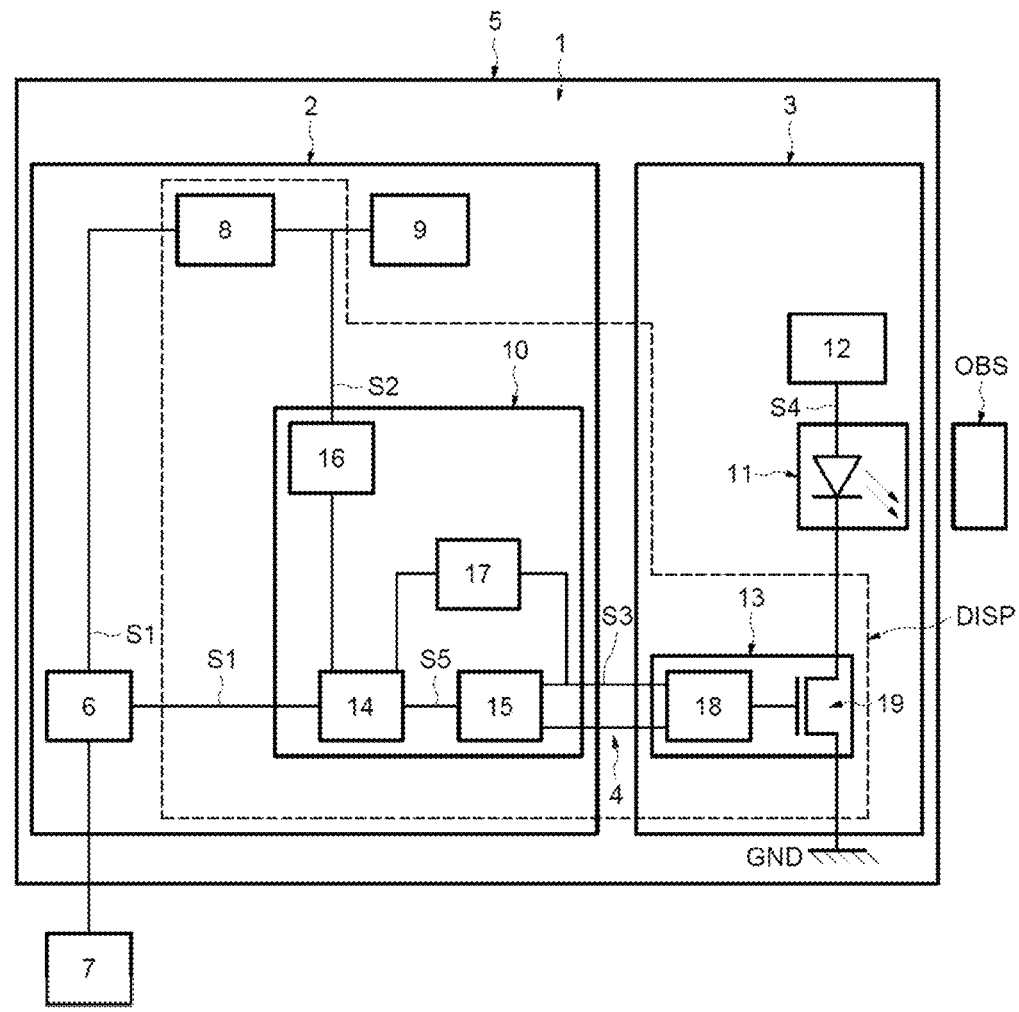
[Fig 2]
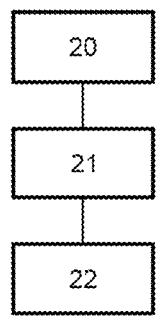

[Fig 3]
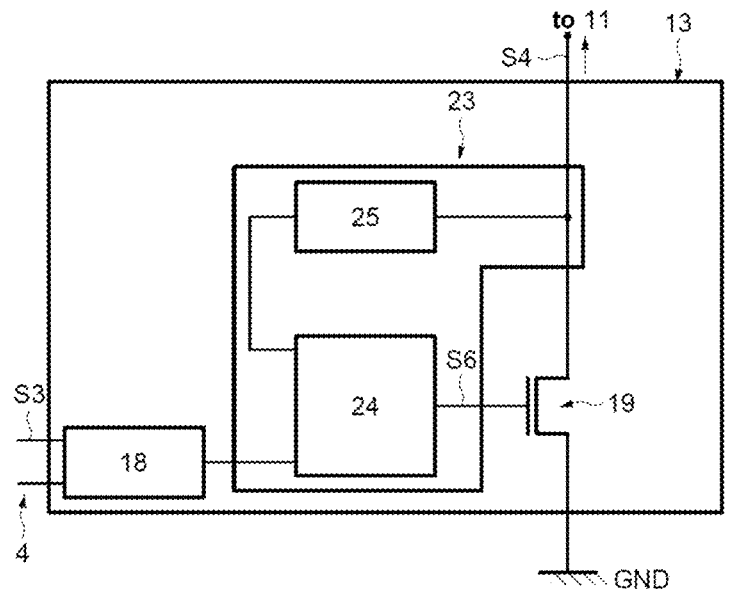
[Fig 4]
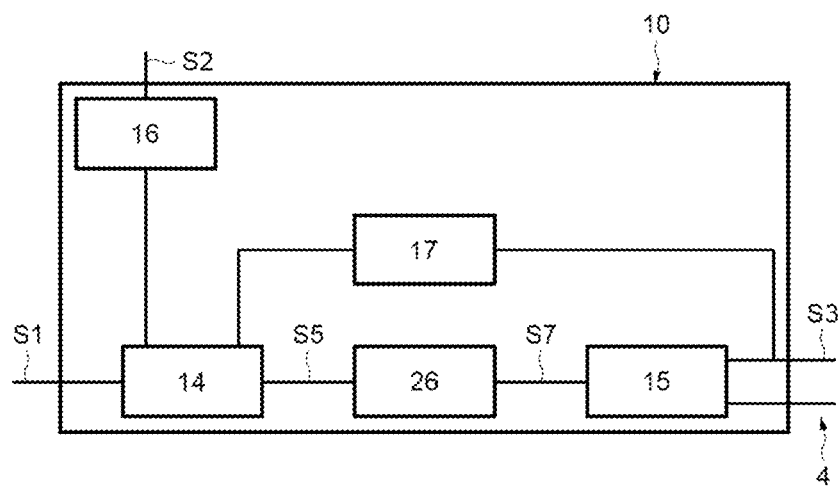

SYCHRONIZATION DEVICE, ASSOCIATED TIME OF FLIGHT SENSOR AND METHOD

CROSS-REFERENCE TO RELATED APPLICATIONS

This application claims the benefit of French Application No. 2001538, filed on Feb. 17, 2020, which application is hereby incorporated herein by reference.

TECHNICAL FIELD

Embodiments and implementations of the invention relate to the synchronization of the emission and the reception of a light signal for sensors, and more specifically for time-of-flight sensors which measure three-dimensional scenes.

BACKGROUND

A time-of-flight sensor comprises a device for emitting a light signal, generally a laser, and a device for receiving the emitted signal reflected off an obstacle, the receiving device comprising an array of pixels.

The reflected signal processed by the receiving device makes it possible to determine the distance that separates the obstacle from the sensor.

Generally, the emitting device and the receiving device are spaced apart from one another, such that the emission of the light signal and the reception of the reflected light signal are desynchronized, which leads to an error in the determination of the measured distance, the receiving device generally transmitting a control signal for controlling the emitting device.

SUMMARY

Moreover, since the emitting and receiving devices are spaced apart from one another, the devices may be subject to different temperature variations, leading to different behaviors of their internal components, in particular the logic gates, such that times taken for signals to propagate through the logic gates desynchronize the emission of the light signal and the reception of the reflected light signal to an even greater extent.

In order to synchronize the emission of the light signal and the reception of the reflected light signal, the time-of-flight sensor comprises a second array of pixels for determining a reference value.

However, installing the second, reference array requires additional silicon area and requires an optical barrier configured to prevent the light ray from being reflected by both the array of pixels and the second array of pixels, the optical barrier entailing an even greater silicon area.

Another solution for synchronizing the emitting and receiving devices consists in using calibration tables to correct the measured distance values.

However, the use of calibration tables diminishes the quality of the distance values provided by the sensor.

The sensor may comprise a feedback loop which connects the emitting and receiving devices, the feedback loop delivering a feedback signal that includes the time taken for the control signal to propagate through the emitting device.

However, generating the feedback signal requires the use of additional components that make the sensor more complex.

There is a need to improve synchronization of the emitting and receiving devices of a time-of-flight sensor.

According to embodiments and implementations, it is advantageously proposed to synchronize the emission and the reception of a light signal for a time-of-flight sensor by driving the device for emitting the light signal on the basis of the synchronization signal that is produced on the basis of a control signal for controlling the receiving device, such that the time taken to produce and transmit the synchronization signal on the basis of the control signal and the time taken to generate and transmit a power signal for supplying power to the array of pixels of the receiving device on the basis of the control signal are identical.

According to one aspect, a method for synchronizing the emission and the reception of a light signal for a time-of-flight sensor is proposed, the method comprising:

generating a power signal on the basis of a control signal for controlling the sensor, the power signal being configured to supply power to an array of pixels of the sensor, transmitting a synchronization signal to a device for emitting the light signal, the synchronization signal being produced on the basis of the control signal such that the time taken to produce and transmit the synchronization signal on the basis of the control signal and the time taken to generate and transmit the power signal on the basis of the control signal are identical.

The method further comprises controlling a switch of the device for emitting the light signal on the basis of the synchronization signal, the switch being configured to supply power to a light source of the device for emitting the light signal.

Advantageously, the synchronization signal makes it possible to control the switch so as to synchronize the emission of the light signal and the reception of the reflected light signal, the synchronization signal being produced by the receiving device.

According to one implementation, controlling the switch comprises generating a conduction signal for the switch on the basis of the synchronization signal and a power-supply signal for supplying power to the light source such that the power-supply signal is synchronized with the synchronization signal.

According to another implementation, generating the synchronization signal comprises generating a modified synchronization signal on the basis of the control signal so as to impose a conduction cycle on the switch, controlling the switch comprising generating a conduction signal for the switch on the basis of the modified synchronization signal and a power-supply signal for supplying power to the light source such that the power-supply signal is synchronized with the synchronization signal while following the imposed conduction cycle.

According to another aspect, a device for synchronizing the emission and the reception of a light signal for a time-of-flight sensor is proposed, the device comprising a power-control circuit configured to generate and transmit a power signal on the basis of a control signal for controlling the sensor, the power signal being configured to supply power to an array of pixels of the sensor, a production module for producing a synchronization signal, which module is configured to produce the synchronization signal on the basis of the control signal, and a switch configured to supply power to a light source of a device for emitting the light signal, the production module being further configured to transmit the synchronization signal to the switch such that the time taken to produce and transmit the synchronization signal and the time taken to generate and transmit the power signal are identical.

The device makes it possible to synchronize the emission of the signal and the reception of part of the reflected light signal.

According to one embodiment, the production module comprises a first delay-locked loop and a communication interface connected to the delay-locked loop, the delay-locked loop being configured to produce the synchronization signal on the basis of the control signal, and the interface being configured to transmit the synchronization signal to the switch such that the time taken to produce and transmit the synchronization signal and the time taken to generate and transmit the power signal are identical.

The use of the second locked loop makes it possible to lock the phase of the switch.

According to another embodiment, the device further comprises a correction module connected between the production module and the switch, the correction module being configured to generate a conduction signal for the switch on the basis of the synchronization signal and a power-supply signal for supplying power to the light source such that the power-supply signal is synchronized with the synchronization signal.

According to yet another embodiment, the correction module comprises a second delay-locked loop configured to generate the conduction signal for the switch on the basis of the synchronization signal and the power-supply signal for supplying power to the light source such that the power-supply signal is synchronized with the synchronization signal.

The use of the second locked loop and of the cycle corrector makes it possible to lock the phase and the duty cycle of the switch.

According to yet another embodiment, the production module further comprises a cycle corrector connected between the first delay-locked loop and the interface, the cycle corrector being configured to generate a modified synchronization signal on the basis of the synchronization signal so as to impose a conduction cycle on the switch, the second delay-locked loop being further configured to generate the conduction signal for the switch on the basis of the modified synchronization signal and the power-supply signal for supplying power to the light source such that the power-supply signal is synchronized with the synchronization signal while following the imposed conduction cycle, the synchronization signal being equivalent to the modified synchronization signal.

According to yet another aspect, a time-of-flight sensor is proposed, the time-of-flight sensor comprising a device for synchronizing the emission and the reception of a light signal such as defined above.

BRIEF DESCRIPTION OF THE DRAWINGS

Other advantages and features of the invention will become apparent upon examining the detailed description of completely non-limiting embodiments and the appended drawings, in which:

FIG. 1 illustrates an embodiment of a time-of-flight sensor;

FIG. 2 illustrates an embodiment device for synchronizing the emission and the reception of a light signal of the time-of-flight sensor of FIG. 1;

FIG. 3 illustrates an embodiment of a switching module; and

FIG. 4 illustrates an embodiment of a production module.

DETAILED DESCRIPTION OF ILLUSTRATIVE EMBODIMENTS

Reference is made to FIG. 1, which shows an example of a first embodiment of a time-of-flight sensor 1 comprising a device 2 for receiving a light signal and a device 3 for emitting the light signal, which devices are connected to one another, for example, by a wired link 4.

The time-of-flight sensor 1 is integrated, for example, into a mobile telephone 5.

The device 2 for receiving a light signal drives the emitting device 3 via the link 4.

The receiving device 2 comprises a control module 6, which generates a control signal S1 for controlling the sensor, for example on the basis of instructions generated by a processing unit 7 of the telephone 5, a power-control circuit 8, which generates and transmits a power signal S2 on the basis of the control signal S1 for controlling the sensor 1, an array of pixels 9, which is supplied with power by the power signal S2 and receives a light signal, and a production module 10 for producing a synchronization signal.

The production module 10 produces a synchronization signal S3 on the basis of the control signal S1, the synchronization signal S3 being conveyed to the emitting device 3 via the link 4.

The emitting device 3 comprises a light source 11, for example a light-emitting diode that emits a laser beam, a driving module 12 for driving the source 11, and a switching module 13, which supplies power to the light source 11, the module including a switch 19.

The laser beam is configured to illuminate an obstacle OBS, the part of the beam reflected by the obstacle OBS being picked up by the array of pixels 9.

The light source 11 is connected both to the driving module 12 and to the switching module 13 such that, independently of the power-supply signals S4 transmitted by the driving module 12, the light source 11 is deactivated or activated depending on the state of the switch 19 of the switching module 13.

The power-control circuit 8, the production module 10 for producing a synchronization signal and the switching module 13 are incorporated into a device DISP for synchronizing the emission and the reception of a light signal of the time-of-flight sensor 1.

The device DISP makes it possible to synchronize the emission of the signal and the reception of part of the reflected light signal.

The production module 10 comprises a first delay-locked loop 14 and a communication interface 15, which is connected to the delay-locked loop 14.

The communication interface 15 is, for example, an LVDS (low-voltage differential signal) communication interface, which receives a digital signal as input and transmits, as output, an analogue signal, the content of which is identical to that of the digital signal received as input.

The delay-locked loop 14 is configured to produce the synchronization signal S3 on the basis of the control signal S1.

The production module 10 further comprises a first voltage translator 16 and a second voltage translator 17, which are configured to convert an analogue signal into a binary signal.

The two voltage translators 16 and 17 are identical, such that the time taken to produce and transmit an analogue signal into a binary signal is identical.

As a variant, the voltage translators 16 and 17 may be differential voltage translators.

The first voltage translator 16 receives the power signal S2 as input and delivers a binary signal representative of the power signal S2 to the locked loop 14, and the second voltage translator 17 receives the synchronization signal S3 as input and delivers a binary signal representative of the synchronization signal S3 to the locked loop 14.

The delay-locked loop 14 is configured to produce the synchronization signal S3 on the basis of the control signal S1, and the interface 15 is configured to transmit the synchronization signal S3 to the switching module 13 such that the time taken to produce and transmit the synchronization signal S3 and the time taken to generate and transmit the power signal S2 are identical.

The switching module 13 may, for example, comprise a communication interface 18, which is an LVDS communication interface in the present case, and which receives the signal S3 transmitted by the interface 15, the communication interface 18 being connected to the switch 19, which comprises, for example, a MOS transistor.

The gate of the MOS transistor is connected to the interface 18, the light source 11 being connected to a ground GND of the device 3 via the drain and the source of the MOS transistor.

FIG. 2 illustrates an exemplary implementation of the device DISP.

It is assumed that the control module 6 delivers the control signal S1.

During a step 20, the power-control circuit 8 generates the power signal S2 on the basis of the control signal S1, the array of pixels 9 being supplied with power.

Then, during a step 21, the delay-locked loop 14 generates a digital intermediate synchronization signal S5, the content of which is identical to that of the analogue synchronization signal S3, on the basis of the control signal S1, the power signal S2 and the synchronization signal S3, such that the time taken to produce and transmit the synchronization signal S3 on the basis of the control signal S1 and the time taken to generate and transmit the power signal S2 on the basis of the control signal S1 are identical.

During a step 22, the transistor 19 is driven by the signal S3 such that the light source 11 emits a laser beam, the part of the beam reflected off the obstacle OBS being picked up by the array 9.

The array 9 and the light source 11 operate in a quasi-synchronous manner such that the measurement of the distance between the sensor 1 and the obstacle OBS is not distorted.

Hereinafter, identical elements are denoted by the same reference numbers.

FIG. 3 illustrates a second exemplary embodiment of the switching module 13.

This embodiment of the switching module 13 differs from the first embodiment of the switching module 13 illustrated in FIG. 1 in that the switching module 13 further comprises a correction module 23 connected between the production module 10 and the switch 19.

The correction module 23 is configured to generate a conduction signal S6 for the switch 19 on the basis of the synchronization signal S3 and the power-supply signal S4 for supplying power to the light source 11 such that the power-supply signal S4 is synchronized with the synchronization signal S3.

The correction module 23 comprises a second delay-locked loop 24, which is configured to generate the conduction signal S6 for the switch 19 on the basis of the synchronization signal S3 and the power-supply signal S4 such that the power-supply signal S4 is synchronized with the synchronization signal S3.

The correction module further comprises a voltage translator 25, which transmits the power signal S4 over a first input of the second delay loop 24, the interface 18 transmitting the synchronization signal S3 over a second input of the second loop 24.

The use of the second locked loop 24 makes it possible to lock the phase of the switch 19.

FIG. 4 illustrates an example of a second embodiment of the production module 10.

The second embodiment of the production module 10 cooperates with the second embodiment of the switching module illustrated in FIG. 3.

The second embodiment of the production module 10 differs from the first embodiment of the production module 10 illustrated in FIG. 1 in that it further comprises a cycle corrector 26 connected between the first delay-locked loop 14 and the interface 15.

The cycle corrector 26 generates a modified synchronization signal S7 on the basis of the intermediate synchronization signal S5 so as to impose a conduction cycle on the switch 19.

The second delay-locked loop 24 generates the conduction signal S6 for the switch 19 on the basis of the modified synchronization signal S7 and the power-supply signal S4 for supplying power to the light source 11 such that the power-supply signal S4 is synchronized with the synchronization signal S3 while following the imposed conduction cycle, the synchronization signal S3 being equivalent to the modified synchronization signal S7.

The use of the second locked loop 24 and of the cycle corrector 26 makes it possible to lock the phase and the duty cycle of the switch 19.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for synchronizing emission and reception of a light signal for a time-of-flight sensor, the method comprising:

generating a power signal to supply power to an array of pixels of the time-of-flight sensor, the power signal generated based on a control signal for controlling the time-of-flight sensor;

transmitting a synchronization signal to a device for emitting the light signal, the synchronization signal being produced based on the control signal, wherein a time taken to produce and transmit the synchronization signal and a time taken to generate and transmit the power signal are identical; and controlling a switch of the device for emitting the light signal based on the synchronization signal, the switch being configured to supply power to a light source of the device for emitting the light signal.

2. The method according to claim 1, wherein controlling the switch comprises generating a conduction signal for the switch based on the synchronization signal and a power-supply signal for supplying the power to the light source, such that the power-supply signal is synchronized with the synchronization signal.

3. The method according to claim 1, wherein generating the synchronization signal comprises generating a modified synchronization signal based on the control signal so as to impose a conduction cycle on the switch, and controlling the switch comprises generating a conduction signal for the switch based on the modified synchronization signal and a power-supply signal for supplying the power to the light source such that the power-supply signal is synchronized with the synchronization signal while following the imposed conduction cycle.

4. A device for synchronizing emission and reception of a light signal for a time-of-flight sensor, the device comprising:
a power-control circuit configured to generate and transmit a power signal based on a control signal for controlling the time-of-flight sensor, wherein the power signal is configured to supply power to an array of pixels of the time-of-flight sensor;
a switch configured to supply power to a light source of an emitting device for emitting the light signal; and
a production circuit configured to:
produce a synchronization signal based on the control signal; and
transmit the synchronization signal to the switch such that a time taken to produce and transmit the synchronization signal and a time taken to generate and transmit the power signal are identical.

5. The device according to claim 4, wherein the production circuit comprises:
a first delay-locked loop, wherein the first delay-locked loop is configured to produce the synchronization signal based on the control signal; and
a communication interface connected to the first delay-locked loop, wherein the communication interface is configured to transmit the synchronization signal to the switch such that the time taken to produce and transmit the synchronization signal and the time taken to generate and transmit the power signal are identical.

6. The device of claim 5, wherein the communication interface is a low-voltage differential signal (LVDS) communication interface.

7. The device according to claim 5, further comprising a correction circuit coupled between the production circuit and the switch, wherein the correction circuit is configured to generate a conduction signal for the switch based on the synchronization signal and a power-supply signal for supplying the power to the light source, such that the power-supply signal is synchronized with the synchronization signal.

8. The device according to claim 7, wherein the correction circuit comprises a second delay-locked loop configured to generate the conduction signal for the switch based on the synchronization signal and the power-supply signal for supplying the power to the light source, such that the power-supply signal is synchronized with the synchronization signal.

9. The device according to claim 8, wherein the production circuit further comprises a cycle corrector connected between the first delay-locked loop and the communication interface, wherein the cycle corrector is configured to generate a modified synchronization signal based on the synchronization signal so as to impose a conduction cycle on the switch, wherein the second delay-locked loop is further configured to generate the conduction signal for the switch based on the modified synchronization signal and the power-supply signal for supplying the power to the light source, such that the power-supply signal is synchronized with the synchronization signal while following the imposed conduction cycle, and wherein the synchronization signal is equivalent to the modified synchronization signal.

10. The device according to claim 4, wherein the switch is a metal-oxide-semiconductor (MOS) transistor.

11. A time-of-flight sensor comprising:
a light source configured to emit a light signal;
an array of light-receiving pixels configured to receive the light signal as reflected by an obstacle; and
a synchronization device configured to synchronize emission and reception of the light signal, the synchronization device comprising:
a power-control circuit configured to generate and transmit a power signal based on a control signal for controlling the time-of-flight sensor, wherein the power signal is configured to supply power to the array of light-receiving pixels;
a switch configured to supply power to the light source; and
a production circuit configured to:
produce a synchronization signal based on the control signal; and
transmit the synchronization signal to the switch such that a time taken to produce and transmit the synchronization signal and a time taken to generate and transmit the power signal are identical.

12. The time-of-flight sensor according to claim 11, wherein the production circuit comprises:
a first delay-locked loop, wherein the first delay-locked loop is configured to produce the synchronization signal based on the control signal; and
a communication interface connected to the first delay-locked loop, wherein the communication interface is configured to transmit the synchronization signal to the switch such that the time taken to produce and transmit the synchronization signal and the time taken to generate and transmit the power signal are identical.

13. The time-of-flight sensor according to claim 12, wherein the communication interface is a low-voltage differential signal (LVDS) communication interface.

14. The time-of-flight sensor according to claim 12, further comprising a correction circuit coupled between the production circuit and the switch, wherein the correction circuit is configured to generate a conduction signal for the switch based on the synchronization signal and a power-supply signal for supplying the power to the light source, such that the power-supply signal is synchronized with the synchronization signal.

15. The time-of-flight sensor according to claim 14, wherein the correction circuit comprises a second delay-locked loop configured to generate the conduction signal for the switch based on the synchronization signal and the power-supply signal for supplying the power to the light source, such that the power-supply signal is synchronized with the synchronization signal.

16. The time-of-flight sensor according to claim 15, wherein the production circuit further comprises a cycle corrector connected between the first delay-locked loop and the communication interface, wherein the cycle corrector is configured to generate a modified synchronization signal based on the synchronization signal so as to impose a conduction cycle on the switch, wherein the second delay-locked loop is further configured to generate the conduction signal for the switch based on the modified synchronization signal and the power-supply signal for supplying the power to the light source, such that the power-supply signal is synchronized with the synchronization signal while following the imposed conduction cycle, and wherein the synchronization signal is equivalent to the modified synchronization signal.

17. The time-of-flight sensor according to claim 11, further comprising a control circuit coupled to the power-control circuit and the production circuit, and configured to generate the control signal.

18. The time-of-flight sensor according to claim 11, further comprising a driving circuit coupled to the light source, and configured to drive the light source.

19. The time-of-flight sensor according to claim 11, wherein the switch is a metal-oxide-semiconductor (MOS) transistor.

20. The time-of-flight sensor according to claim 11, wherein the light source is a light emitting diode, and the light signal is a laser signal.

\* \* \* \* \*